United States Patent [19]

Sokolov et al.

[11] 4,264,570

[45] Apr. 28, 1981

[54] METHOD OF PRODUCING MAGNESIUM SULPHATE

[76] Inventors: Igor D. Sokolov, Zanevsky prospekt, 32, kv. 200; Oleg D. Kashkarov, Nalichnaya ulitsa, 36, korpus 3, kv. 89; Jury S. Safrygin, ulitsa Dekabristov, 29, kv. 36; Alexandr V. Muraviev, prospekt Kima, 4, kv. 210; Nina K. Andreeva, 2 Komsomolskaya ulitsa, 57, korpus 1, kv. 22, all of Leningrad, U.S.S.R.

[21] Appl. No.: 15,652

[22] Filed: Feb. 27, 1979

[51] Int. Cl.$^3$ .................... C01F 5/42; C01B 31/24; C01F 5/24
[52] U.S. Cl. .................... 423/554; 423/140; 423/165; 423/419 R; 423/DIG. 2
[58] Field of Search ............... 423/554, 173, 165, 166, 423/147, 140, 419 R, DIG. 2

[56] References Cited

U.S. PATENT DOCUMENTS

| 842,452 | 1/1907 | Flugge | 423/419 |
| 1,112,770 | 10/1914 | Clarke | 423/DIG. 2 |
| 3,617,562 | 11/1971 | Cywin | 423/DIG. 2 |
| 4,126,663 | 11/1978 | Pitts | 423/166 |

FOREIGN PATENT DOCUMENTS

| 7411995 | 12/1976 | Netherlands | 423/DIG. 2 |
| 2630 | of 1856 | United Kingdom | 423/419 |

*Primary Examiner*—O. R. Vertiz
*Assistant Examiner*—Gary P. Straub
*Attorney, Agent, or Firm*—Holman & Stern

[57] ABSTRACT

A method of producing magnesium sulphate comprises the steps of interacting ferrous sulphate with compounds including magnesium carbonates, oxides and hydroxides, with magnesium sulphate being produced. The step of interacting the starting reagents is conducted in water medium in the presence of carbon dioxide and is effected in the range of temperatures of 80° to 100° C.

1 Claim, No Drawings

METHOD OF PRODUCING MAGNESIUM SULPHATE

FIELD OF THE INVENTION

The present invention relates generally to the chemical processing of inorganic substances, and more particularly, to a method of producing magnesium sulphate.

The present invention can most advantageously be utilized in the production of magnesium sulphate, which currently finds application, for example, as a fertilizer in agriculture when manufacturing chlorine-free magnesium fertilizers, particularly for top-dressing of plants among light and pit-grown bog soils of the turf-podzol zone, ferruginous and subtropical podzol soils of the humid subtropical zone, and also in the paper pulp industry in the manufacture of paper.

BACKGROUND OF THE INVENTION

In the prior art there are known methods of producing magnesium sulphate contemplating the processing of natural polymineral ores or brines comprised of magnesium sulphate, with ferrous sulphate being employed as a sulphate-containing component, and the process of thermal treatment being conducted at a temperature ranging from 400° to 900° C.

The lengthy processes and the necessity of use of the corrosion-resistant equipment required for practicing these prior art methods should be considered as apparent disadvantages. Moreover, while practicing the foregoing methods ferrous sulphate is to be employed in crystalline form, which requires an additional expenditure of energy for its recovery from the effluent solutions.

Also known in the prior art is a method of processing pickling lyes with a suspension of magnesium hydroxide and calcium hydroxide, residing in that by means of interacting pickling solutions comprises of free sulphuric acid and ferrous sulphate with active magnesium and calcium hydroxides, the resulting solution of magnesium and calcium sulphates is formed, which solution is treated by burnt and hydrated dolomitic lime with the formation of gypsum and active magnesium hydroxide, a portion of which is returned to the cycle.

The disadvantages inherent in the above described method consist in its multiplicity of stages and complexity encountered in carrying out the procedures, as well as its low efficiency due to the use of active magnesium hydroxide and the effectuation of the process in the highly diluted solutions.

Also known in the prior art is a method of producing magnesium sulphate by means of exchange interaction of magnesium compounds with ferrous sulphate (cf. e.g., Inventor's Certificate No. 384793).

A homogenized dry mixture of ferrous sulphate and magnesium carbonate is calcinated at a temperature of 500° to 900° C.

Subsequently, magnesium sulphate is lixiviated by water, the suspension is filtered and the ultimate product is separated from the solution.

At the present time it has been found that at a temperature of 80°–160° C. in treating a mixture of a heptahydrate of ferrous sulphate and magnesium carbonate, the heptahydrate of ferrous sulphate is dehydrated first to a tetra, and then to a monohydrate. Further heating to 400° C. causes the monohydrate to be dehydrated and the iron to be oxidized, with ferrous sulphate and hydrosulphate being produced. The process of interaction of the ferrous sulphates with magnesium carbonate is intensive enough only over the range of temperatures from 550° to 700° C. The highest degree of conversion (about 70%) of magnesium carbonate on interacting with ferrous sulphate to magnesium sulphate takes place at a temperature of 650° C.

The degree of conversion is defined as a ratio of the amount of magnesium transformed to magnesium sulphate to the amount of magnesium comprised in the starting material.

The disadvantages intrinsic in the foregoing method lie in the complexity of its implementation due to the impossibility of recovering magnesium sulphate as an ultimate product, inasmuch as the use of active magnesium hydroxide in the process is indispensable to the accomplishment of the method, which substance is highly difficult to obtain in practice, and therefore magnesium sulphate produced by this method is merely an intermediate product.

On thermal interaction of ferrous sulphate with magnesium carbonate, ferrous sulphate is intensively decomposed at a temperature over 500° C. with the formation of sulphur oxides, which causes the combustible gaseous mixtures to become contaminated with the latter. For example, at 600° C. up to 30% of ferrous sulphate is decomposed with the release of sulphur oxides, while the process of thermal treatment is under way. In case of the use of commercial copperas instead of pure ferrous sulphate, for instance, a waste product of the manufacture of titanium dioxide, the process of decomposing the sulphates is even more intensive and occurs at a lower temperature.

Consequently, the above-described prior art method is industrially impracticable.

Another disadvantage of this prior art method, which also makes its industrial application unfeasible, lies in the fact that the method can be realized only on condition that small amounts of pure ferrous sulphate with magnesium carbonate are properly grounded and thermally treated.

SUMMARY OF THE INVENTION

It is an object of the present invention to eliminate the foregoing disadvantages.

Another object of the present invention is to provide the production of high-quality magnesium sulphate.

Still another object of the present invention is to simplify the processing technology employed for the production of magnesium sulphate, enabling the process to be conducted at low temperatures and to exclude noxious ejections to the atmosphere.

A further object of the present invention is to intensify the process of producing magnesium sulphate in water medium in the presence of carbon dioxide.

A still further object of the present invention is to step up the performance and efficiency indexes at the cost of reducing the expenditures of energy incident to the reaction of the compounds.

Yet another object of the present invention is to provide a method of producing magnesium sulphate, while enabling to recover the waste products of titanium dioxide manufacture to be recovered.

These and other objects of the present invention are accomplished by provision of a method of producing magnesium sulphate by means of interacting ferrous sulphate with compounds including magnesium carbonates, oxides and hydroxides, with magnesium sulphate being produced, wherein, according to the invention, the process of interacting the starting reagents is conducted in water medium in the presence of carbon dioxide.

The said method permits high-quality magnesium sulphate with a high degree of extraction in the ultimate product to be obtained.

In order to practice this method there is no need to employ complex corrosion-resistant facilities since the process takes place in non-corrosive water medium.

Furthermore, it is possible to use carbon dioxide being formed as a result of the thermal treatment of magnesite at operating enterprises which presently are discarding carbon dioxide to the atmosphere. This permits the heat of the waste gases to be utilized while conducting the process of conversion.

It is desirable that the process of interacting the starting reagents be effected within the range of temperatures from 80° to 100° C. The effectuation of the process at such relatively low temperatures enables noxious ejections to the atmosphere to be eliminated.

The foregoing and other objects and features of novelty of the present invention are defined in the appended claims and the present invention will become more readily apparent on consideration of the following detailed description of its preferred embodiments.

DESCRIPTION OF THE PREFERRED EMBODIMENTS OF THE INVENTION

A method of producing magnesium sulphate is preferably accomplished as follows.

A suspension of ferrous sulphate and compounds comprised of magnesium carbonates, oxides and hydroxides, e.g. magnesite, is prepared in a reactor, and carbon dioxide is then passed through the resultant suspension.

Process control is effected by the content of magnesium ions in the solution. On completion of the process, water-insoluble ferrous compounds are separated and washed, while the mother liquor and washing waters are dried with the production of magnesium sulphate, or else the combined solution is directly used, for example, in the manufacture of potassium sulphate, construction materials, etc. The water-insoluble ferrous compounds after washing are dried and used, for example, in the manufacture of ferroxide pigments.

The presence of carbon dioxide permits completion of the reaction between ferrous sulphate and magnesite in three hours with a degree of conversion being as high as 98%.

The degree of conversion depends on the temperature of the exchange interaction process, and, on increasing the temperature, the degree of extraction drastically increases, while the degree of conversion correspondingly drops.

The degree of extraction depends on the degree of conversion of the starting product to the ultimate one and on the degree of washing and is equal to a ratio of the amount of magnesium in the ultimate product to the amount of magnesium in the starting product.

$$C = (A/B) \cdot 100\%,$$

where
A—amount of magnesium in the ultimate product
B—amount of magnesium in the starting product
C—degree of extraction Given below are typical examples illustrative of certain aspects of the present invention and revealing more clearly its salient features and advantages.

EXAMPLE 1

A suspension is prepared being comprised of:
water: 158.2 kg
magnesite: 16.8 kg
copperas: (as a source of ferrous sulphate): 105.8 kg
Magnesite used in the production of magnesium sulphate has the following composition:
magnesium oxide 89.8 wt.%
calcium oxide 3.3 wt.%
ferrous oxide-aluminium oxide: 2.1 wt.%
silica: 4.8 wt.%
It is precalcinated for 40 minutes at 700° C. since magnesite is partially decomposed in the calcination with the formation of basic magnesium carbonate which is more active and magnesium oxide. Copperas is comprised of:
heptahydrate of ferrous sulphate: 83.6 wt.%
monohydrate of ferrous sulphate: 5.3 wt.%
sulphuric acid: 2.5 wt.%
titanium dioxide: 1.5 wt.%
water: 5.9 wt.%
other admixtures: 1.2 wt.%

Carbon dioxide is passed through the resultant suspension while mixing it at a temperature of 0° C. for ten hours, whereupon the suspension is filtered. The extracted sediment is washed and dried.

46.6 kg of the ultimate product is produced.

The degree of magnesium extraction in the solution amounts to 86.5%.

A material balance of the major interacting components is presented in Table 1.

From the results given in Table 1 it becomes apparent that under the specified conditions there is formed a solution of magnesim sulphate including:
magnesium sulphate: 16.5 wt.%
ferrous sulphate: 3.3 wt.%

EXAMPLE 2

In order to produce high-purity magnesium sulphate in laboratory conditions, the process of extraction is conducted similarly to the method described in Example 1, using as the source material basic magnesium carbonate in 10% excess of the stoichiometric quantity and ferric sulphate.

The degree of magnesium extraction in the solution amounts at that to 91%.

EXAMPLE 3

A suspension is prepared being comprised of:
water: 158.2 kg
magnesite calcinated
for 40 min. at 700° C.: 16.8 kg
copperas (as a source of ferrous sulphate): 105.8 kg
Magnesite and copperas have the same compositions as those described in Example 1.

Carbon dioxide is passed through the suspension while mixing it from three hours at 25° C., whereupon it is heated to a temperature of 90° C., mixed for an hour and filtered.

The extracted sediment is washed, dried and 45.5 kg of the ultimate product is produced.

The degree of magnesium extraction in the solution amounts to 94.5%.

A process material balance of the major interacting components is presented in Table 2.

From the results given in the Table it becomes apparent that under the specified conditions there is formed a solution of magnesium sulphate including:
magnesium sulphate: 18.3 wt.%
ferrous sulphate: 0.6 wt.%

EXAMPLE 4

A suspension is prepared being comprised of:
water: 150.0 kg
magnesite calcinated at 700° C. for 40 min.: 16.3 kg
copperas (as a source of ferrous sulphate): 102.1 kg Magnesite and copperas have the same composition as those described in Example 1.

Carbon dioxide is passed through the suspension while mixing it for three hours at 0° C., whereupon it is heated to a temperature of 90° C., mixed for three hours and filtered. The extracted sediment is washed, dried and 43.6 kg of the ultimate product is produced.

The degree of magnesium extraction in the solution amounts to 96.6%.

A process material balance of the major interacting components is presented in Table 3.

From the results given in Table 3 it becomes apparent that in this case there is formed a solution of magnesium sulphate including:
magnesium sulphate: 18.5 wt.%
ferrous sulphate: 1.1 wt.%

EXAMPLE 5

A suspension is prepared being comprised of:
water: 100.0 kg
magnesite calcinated for 40 min. at 700° C.: 16.1 kg
copperas (as a source of ferrous sulphate): 101.2 kg Magnesite and copperas have the same compositions as those described in Example 1.

Carbon dioxide is passed through the suspension while mixing it for three hours at a temperature of 25° C., which is followed by heating it to a temperature of 80° C. and mixing for an hour, whereupon it is filtered, the extracted sediment is washed and dried. 43.5 kg of the ultimate product is produced. The degree of magnesium extraction in the solution amounts to 93.1%.

The decreased consumption of water in the given example as compared to the foregoing one permits a more concentrated solution of magnesium sulphate to be obtained.

A process material balance of the major interacting components is presented in Table 4.

From the results given in Table 4 it becomes apparent that under the specified conditions there is formed a solution of magnesium sulphate including:
magnesium sulphate: 23.8 wt.%
ferrous sulphate: 1.6 wt.%

EXAMPLE 6

A suspension is prepared being comprised of:
water: 120.0 kg
magnesite calcinated at 700° C. for 40 min: 8.1 kg
copperas (as a source of ferrous sulphate): 51.1 kg Magnesite and copperas have the same compositions as those specified in Example 1.

Carbon dioxide is passed through the suspension while mixing it for three hours followed by heating it to a temperature of 100° C. and mixing for an hour, whereupon the suspension is filtered, the extracted sediment is washed and dried. 20.5 kg of the ultimate product is produced.

The degree of magnesium extraction in the solution amounts to 98.2%.

The increased consumption of water in the given example as compared to those described above permits the degree of magnesium extraction in the solution to be improved, but along with it the solution of magnesium sulphate being formed is of low concentration.

A process material balance of the major interacting components is presented in Table 5.

From the results given in Table 5 it follows that the experiment considered hereinabove results in the formation of a solution of magnesium sulphate including:
magnesium sulphate: 10.3 wt.%
ferrous sulphate: 0.5 wt.%

The production of concentrated magnesium sulphate by the inventive method has been checked on a model installation. The degree of extraction of magnesium in magnesium sulphate on interacting ferrous sulphate with magnesite in the presence of carbon dioxide reaches up to 95%. Such a high degree of extraction of the useful components is attained at a temperature of the reaction up to 100° C.

EXAMPLE 7

A suspension is prepared having the following composition:
water: 158 kg
magnesite calcinated at 700° C. for 40 min.: 17 kg
copperas (as a source of ferrous sulphate): 105.8 kg Magnesite of natural origin has the following composition:
magnesium oxide: 46.6 wt.%
calcium oxide: 1.7 wt.%
ferrous oxide-aluminium oxide: 1.1 wt.%
silica: 2.5 wt.%
losses in calcination: 48.2 wt.%

Copperas is a waste product, for example, of titanium dioxide manufacture, and includes:
heptohydrate of ferrous sulphate: 88.66 wt.%
monohydrate of ferrous sulphate: 5.65 wt.%
sulphuric acid: 0.55 wt.%
titanium dioxide: 1.50 wt.%
water: 3.04 wt.%
other admixtures: 0.60 wt.%

Carbon dioxide is passed through the suspension at a temperature of 25° C. for three hours, whereupon the suspension is filtered, the extracted sediment is washed and dried. 27.2 kg of the ultimate product is produced.

The degree of magnesium extraction obtained amounts to 86.5%.

Under these conditions there is formed a solution of magnesium including:
magnesium sulphate: 16.5 wt.%
ferrous sulphate: 3.27 wt.%

A process material balance of the major interacting components is presented in Table 6.

While describing by way of example the various embodiments of the present invention a particular set of specialized nomenclature has been resorted to in order to provide better clarity. However, it is to be borne in mind that the present invention is not to be limited in the least by the adopted nomenclature and that every such term thereof covers all of the equivalent elements accomplishing the same function and employed for attaining the same objects.

Although the present invention has been disclosed hereinabove with reference being made to the preferred typical embodiments thereof, it should be clear to those skilled in the art that minor modifications and variations may be introduced into the performance of the steps of the method of producing magnesium sulphate without departing from the spirit of the invention.

All such modifications and variations are considered to be well within the spirit and scope of the invention defined by the appended claims.

TABLE 1

| Expenditure articles | Process material balance of major interacting components | | | | | | | | |
|---|---|---|---|---|---|---|---|---|---|
| | Consumption kg | Composition, % | | | | Amount, kg | | | |
| | | $Fe^{+2,+3}$ | $Mg^{+2}$ | $SO_4^{2-}$ | $H_2O$ | $Fe^{+2,+3}$ | $Mg^{2+}$ | $SO_4^{2-}$ | $H_2O$ |
| Income | | | | | | | | | |
| Copperas | 105.8 | 17.8 | — | 34.1 | 45.5 | 18.8 | — | 36.1 | 48.1 |
| Calcinated magnesite | 16.8 | — | 54.1 | — | — | — | 9.1 | — | — |
| Water | 158.2 | — | — | — | 100.0 | — | — | — | 158.2 |
| Total: | 280.8 | | | | | 18.8 | 9.1 | 36.1 | 206.3 |
| Expenditure | | | | | | | | | |
| 1 Solid phase with soaking liquor after suspension separation | 95.8 | 16.8 | 3.2 | 10.3 | 48.1 | 16.1 | 3.1 | 9.9 | 46.1 |
| 2 Liquid phase after suspension separation | 165.3 | 1.2 | 3.4 | 15.4 | 80.2 | 1.9 | 5.6 | 25.4 | 132.6 |
| Total: | 261.1 | | | | | 18.0 | 8.7 | 35.3 | 178.7 |

TABLE 2

| Expenditure articles | Process material balance of major interacting components | | | | | | | | |
|---|---|---|---|---|---|---|---|---|---|
| | Consumption kg | Composition, % | | | | Amount, kg | | | |
| | | $Fe^{+2,+3}$ | $Mg^{+2}$ | $SO_4^{2-}$ | $H_2O$ | $Fe^{+2,+3}$ | $Mg^{2+}$ | $SO_4^{2-}$ | $H_2O$ |
| Income | | | | | | | | | |
| Copperas | 105.8 | 17.8 | — | 34.1 | 45.5 | 18.8 | — | 36.1 | 48.1 |
| Calcinated magnesite | 16.8 | — | 54.1 | — | — | — | 9.1 | — | — |
| Water | 158.2 | — | — | — | 100.0 | — | — | — | 158.2 |
| Total: | 280.8 | | | | | 18.8 | 9.1 | | 206.3 |
| Expenditure | | | | | | | | | |
| 1. Solid phase with soaking liquor after suspension separation | 93.2 | 19.1 | 2.5 | 10.3 | 44.2 | 17.8 | 2.3 | 9.6 | 41.2 |
| 2. Liquid phase after suspension separation | 173.5 | 0.2 | 3.7 | 15.0 | 80.8 | 0.4 | 6.4 | 26.0 | 140.2 |
| Total: | 266.7 | | | | | 18.2 | 8.7 | 35.6 | 181.4 |

TABLE 3

| Expenditure articles | Process material balance of major interacting components | | | | | | | | |
|---|---|---|---|---|---|---|---|---|---|
| | Consumption, kg | Composition, % | | | | Amount, kg | | | |
| | | $Fe^{+2,+3}$ | $Mg^{+2}$ | $SO_4^{2-}$ | $H_2O$ | $Fe^{+2,+3}$ | $Mg^{2+}$ | $SO_4^{2-}$ | $H_2O$ |
| Income | | | | | | | | | |
| Copperas | 102.1 | 17.8 | — | 34.1 | 45.5 | 18.1 | — | 34.8 | 46.5 |
| Calcinated magnesite | 16.3 | — | 54.08 | — | — | — | 8.8 | — | — |
| Water | 150.0 | — | — | — | 100 | — | — | — | 150.0 |
| Total: | 268.4 | | | | | 18.1 | 8.8 | 34.8 | 196.5 |
| Expenditure | | | | | | | | | |
| 1. Solid phase with soaking liquor after suspension separation | 109.1 | 16.0 | 2.6 | 10.4 | 50.0 | 17.4 | 2.8 | 11.3 | 54.6 |
| 2. Liquid phase after suspension separation | 143.4 | 0.4 | 3.7 | 15.5 | 80.4 | 0.6 | 5.4 | 22.2 | 115.3 |
| Total: | 252.5 | | | | | 18.0 | 8.2 | 33.5 | 169.9 |

TABLE 4

| | Consumption, kg | Composition, % | | | | Amount, kg | | | |
|---|---|---|---|---|---|---|---|---|---|
| Expenditure articles | | $Fe^{+2,+3}$ | $Mg^{+2}$ | $SO_4^{2-}$ | $H_2O$ | $Fe^{+2,+3}$ | $Mg^{2+}$ | $SO_4^{2-}$ | $H_2O$ |
| Debit | | | | | | | | | |
| 1 Copperas | 101.2 | 17.8 | — | 34.1 | 45.5 | 18.0 | — | 34.5 | 46.1 |
| 2 Calcinated magnesite | 16.1 | — | 54.1 | — | — | — | 8.7 | — | — |
| 3 Water | 100.0 | — | — | — | 100.0 | — | — | — | 100.0 |
| Total: | 217.9 | | | | | 18.0 | 8.7 | 34.5 | 146.1 |
| Credit | | | | | | | | | |
| 1 Solid phase with soaking liquor after suspension separation | 129.0 | 13.6 | 3.6 | 14.5 | 49.9 | 17.5 | 4.6 | 18.7 | 64.4 |
| 2 Liquid phase after suspension separation | 75.1 | 0.6 | 4.8 | 19.9 | 74.8 | 0.4 | 3.6 | 14.9 | 56.2 |
| Total: | 204.1 | | | | | 17.9 | 8.2 | 33.6 | 120.6 |

TABLE 5

| | Consumption kg | Composition, % | | | | Amount, kg | | | |
|---|---|---|---|---|---|---|---|---|---|
| Expenditure articles | | $Fe^{+2,+3}$ | $Mg^{+2}$ | $SO_4^{2-}$ | $H_2O$ | $Fe^{+2,+3}$ | $Mg^{2+}$ | $SO_4^{2-}$ | $H_2O$ |
| Income | | | | | | | | | |
| Copperas | 51.1 | 17.8 | — | 34.1 | 45.5 | 9.1 | — | 17.4 | 23.3 |
| Calcinated magnesite | 8.1 | — | 54.1 | — | — | — | 4.4 | — | — |
| Water | 120.0 | — | — | — | 100.0 | — | — | — | 120.0 |
| Total: | 179.2 | | | | | 9.1 | 4.4 | 17.4 | 143.3 |
| Expenditure | | | | | | | | | |
| Solid phase with soaking liquor after suspension separation | 45.2 | 19.1 | 2.1 | 8.6 | 43.9 | 8.6 | 0.9 | 3.9 | 19.8 |
| Liquor phase after suspension separation | 119.2 | 0.2 | 2.6 | 10.9 | 86.3 | 0.2 | 3.1 | 12.9 | 102.9 |
| Total: | 164.4 | | | | | 8.8 | 4.0 | 16.8 | 122.7 |

TABLE 6

| | Consumption kg | Composition, % | | | | Amount, kg | | | |
|---|---|---|---|---|---|---|---|---|---|
| Expenditure articles | | $Fe^{+2,+3}$ | $Mg^{+2}$ | $SO_4^{2-}$ | $H_2O$ | $Fe^{+2,+3}$ | $Mg^{+2}$ | $SO_4^{-2}$ | $H_2O$ |
| Income | | | | | | | | | |
| Water | 158.2 | — | — | — | 100 | | | | 158.2 |
| Calcinated magnesite | 17.0 | — | 53.6 | — | — | — | 9.1 | — | — |
| Copperas | 105.8 | 17.6 | — | 34.0 | 48.4 | 18.6 | — | 36.0 | 51.2 |
| Total: | 281.0 | | | | | 18.6 | 9.1 | 36.0 | 209.4 |
| Expenditure | | | | | | | | | |
| Solid phase with soaking liquor after suspension separation | 95.8 | 16.8 | 3.2 | 10.3 | 69.7 | 16.1 | 3.1 | 9.9 | 66–7 |
| Liquid phase after suspension separation | 165.3 | 1.2 | 3.4 | 15.2 | 80.2 | 1.9 | 5.5 | 25.2 | 132.7 |
| Total: | 261.1 | | | | | 18.1 | 8.6 | 35.1 | 199.4 |

What is claimed is:

1. A method of producing magnesium sulfate comprising the steps of:
   (a) forming a suspension in aqueous medium of ferrous sulfate or ferrous sulfate containing material and at least one magnesium compound selected from the group consisting of magnesium carbonate, magnesium oxide or magnesium hydroxide, both the magnesium compound and the ferrous sulfate containing material being solid components of the suspension;
   (b) introducing $CO_2$ with mixing to the suspension while maintaining the suspension at a temperature of 0° to 25° C. for a period of up to 10 hours;
   (c) additional heating of the suspension in step (b) at a temperature of 80° to 100° C. thereby forming a precipitate and a supernatant liquid;
   (d) subsequently separating said precipitate formed during step (c) from said supernatant liquid and
   (e) evaporation of water from the supernatant liquid of step (d) to produce magnesium sulfate.

* * * * *